United States Patent
Tingle

(10) Patent No.: US 11,426,952 B2
(45) Date of Patent: Aug. 30, 2022

(54) LAY-UP HEAD

(71) Applicant: ROLLS-ROYCE PLC, London (GB)

(72) Inventor: James Tingle, Derby (GB)

(73) Assignee: ROLLS-ROYCE PLC, London (GB)

( * ) Notice: Subject to any disclaimer, the term of this patent is extended or adjusted under 35 U.S.C. 154(b) by 564 days.

(21) Appl. No.: 15/756,855

(22) PCT Filed: Aug. 31, 2016

(86) PCT No.: PCT/GB2016/052687
§ 371 (c)(1),
(2) Date: Mar. 1, 2018

(87) PCT Pub. No.: WO2017/037446
PCT Pub. Date: Mar. 9, 2017

(65) Prior Publication Data
US 2018/0272627 A1  Sep. 27, 2018

Related U.S. Application Data

(60) Provisional application No. 62/213,912, filed on Sep. 3, 2015.

(30) Foreign Application Priority Data

Sep. 9, 2015  (GB) .................................... 1515955

(51) Int. Cl.
*B29C 70/38* (2006.01)
*B29K 63/00* (2006.01)
(Continued)

(52) U.S. Cl.
CPC .......... *B29C 70/384* (2013.01); *B29C 70/388* (2013.01); *B29K 2063/00* (2013.01); *B29K 2105/0881* (2013.01); *B29K 2105/106* (2013.01)

(58) Field of Classification Search
CPC ............................................ B29C 70/382–388
See application file for complete search history.

(56) References Cited

U.S. PATENT DOCUMENTS 3,574,040 A * 4/1971 Chitwood ............. B29C 70/386
                                                              156/522
4,461,669 A    7/1984 Dontscheff
(Continued)

FOREIGN PATENT DOCUMENTS

DE   102012017593 A1   3/2014
EP       0118266 A1   9/1984
(Continued)

OTHER PUBLICATIONS

Yamakawa, Yuhei, English machine translation of JPS62144927, Jun. 1987 (Year: 1987).*

(Continued)

*Primary Examiner* — Christopher T Schatz
(74) *Attorney, Agent, or Firm* — Banner & Witcoff, Ltd.

(57) ABSTRACT

There is provided a lay-up head for applying elongate fibre reinforcement material to an application surface. The lay-up head comprises a support head having a transverse axis, a dispensing mechanism carried by the support head for dispensing elongate fibre reinforcement material, and a roller for pressing elongate fibre composite material against the application surface. The roller is tiltable with respect to the support head such that the roller axis can be angled with respect to the transverse axis of support head. The lay-up head also comprises a holding mechanism operable to hold the roller in a central position in which the roller axis is parallel to the transverse axis of the support head.

19 Claims, 6 Drawing Sheets

Figure 1:
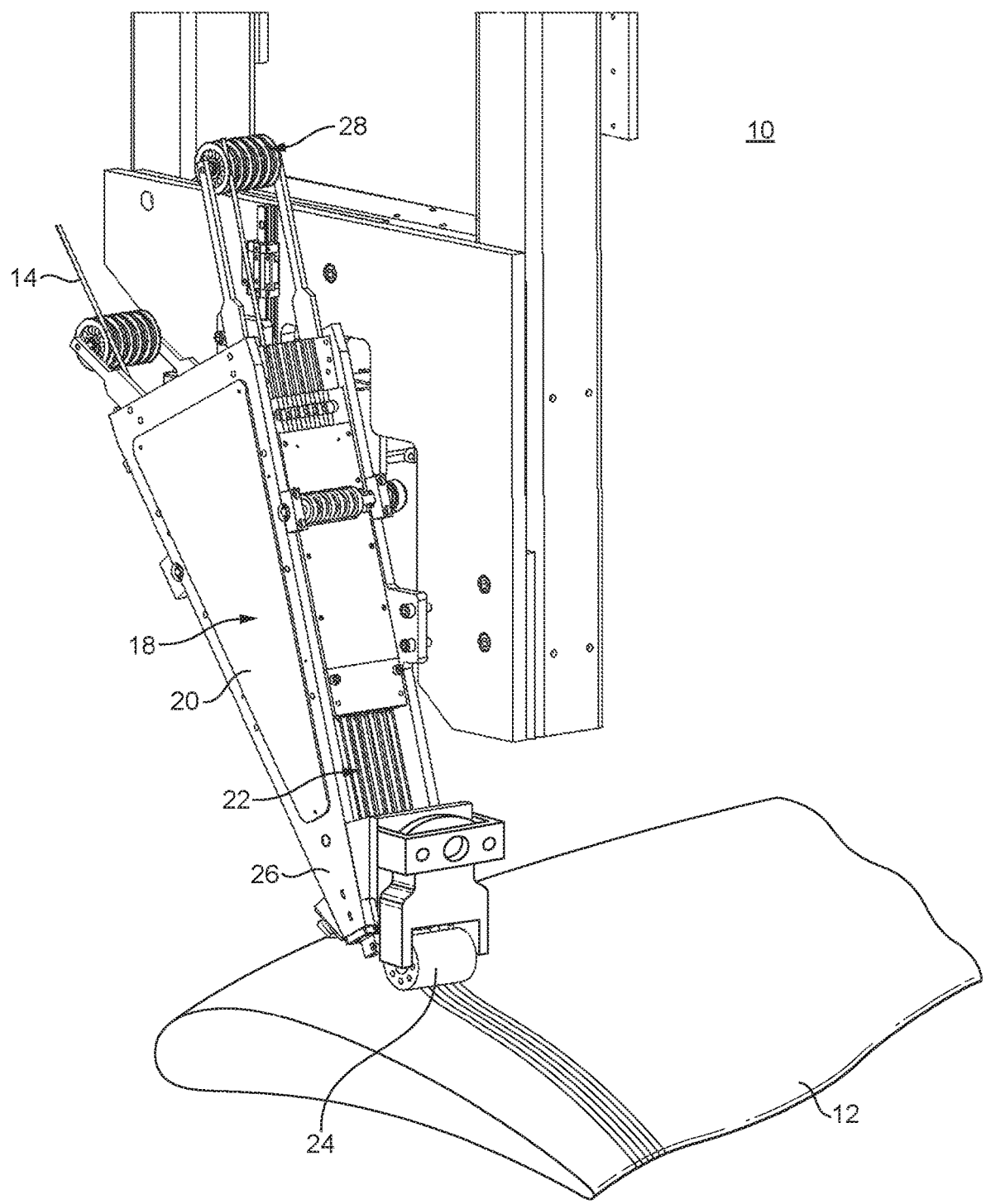

(51) Int. Cl.
B29K 105/08 (2006.01)
B29K 105/10 (2006.01)

(56) References Cited

U.S. PATENT DOCUMENTS

| | | | |
|---|---|---|---|
| 4,869,761 A | | 9/1989 | Weingart et al. |
| 4,997,510 A | | 3/1991 | Shinno et al. |
| 5,176,785 A | | 1/1993 | Poyet et al. |
| 5,700,347 A | | 12/1997 | McCowin |
| 6,026,883 A | * | 2/2000 | Hegerhorst ............ B29C 70/384 156/361 |
| 2009/0139654 A1 | * | 6/2009 | Wampler ............... B29C 70/384 156/324 |
| 2011/0297303 A1 | * | 12/2011 | Borsting ............... B29C 70/388 156/212 |

FOREIGN PATENT DOCUMENTS

| | | | | |
|---|---|---|---|---|
| JP | 1990032126 B2 | | 6/1987 | |
| JP | S62144927 | * | 6/1987 | ............. B29C 41/36 |

OTHER PUBLICATIONS

Feb. 19, 2016—(GB) Search Report—App. No. GB1515955.1—4 pages.
Nov. 18, 2016—(WO) International Search Report and Written Opinion—App. No. PCT/GB2016/052687—11 pages.
Dec. 18, 2019—(JP) Office Action—App 2018-511609 (with translation).

* cited by examiner

LAY-UP HEAD

CROSS REFERENCE TO RELATED APPLICATIONS

This application is a National Stage Application under 35 U.S.C. § 371 of co-pending PCT application number PCT/GB2016/052687, filed 31 Aug. 2016; which claims priority to GB1515955.1, filed 9 Sep. 2015, which claims priority to U.S. Provisional Application No. 62/213,912, filed 3 Sep. 2015, all of which are hereby incorporated by reference in their entireties for any and all non-limiting purposes.

LAY-UP HEAD

The invention relates to a composite material lay-up head for applying elongate fibre reinforcement material to an application surface. In particular, although not exclusively, the invention relates to a lay-up head having a tiltable roller which can be held in a central position.

Fibre composite components are frequently used for applications requiring a combination of light weight and strength, for example in sports equipment and in aerospace components. Most fibre composite manufacturing processes require successive layers of fibre reinforcement material to be applied to a tool, article or a mould in a lay-up process to form a pre-form. A matrix material is typically pre-applied to the fibre reinforcement material (pre-impregnated, or "pre-preg") before lay-up of the component. Recent manufacturing developments have allowed the lay-up process to be performed automatically.

Three types of automatic composite manufacturing processes are Automatic Tape Laying (ATL), Automatic Fibre Placement (AFP) and automatic filament winding. ATL relates to the application of a tape comprising fibre reinforcement material to a tool. The tape typically comprises unidirectional fibres which are pre-impregnated with matrix material (e.g. epoxy resin). Successive tape layers are typically applied at different orientations from one another to form a ply structure.

In AFP, the fibre reinforcement material is applied to a tool in the form of a "tow", comprising a plurality of individual fibres, or multiple "tows". Alternatively, a "tow" may be a narrow width of tape slit from a wider tape. AFP is typically more suitable for complex parts having a higher degree of curvature or non-uniform curvature. The fibres are typically pre-impregnated with matrix material or drawn through a bath of matrix material. A course or series of "tows" is typically applied to the tool by an applicator roller.

Automatic filament winding differs from AFP in that the tool is typically a rotating mandrel and the lay-up equipment typically traverses the mandrel to apply a tow of fibres in tension over the mandrel surface. The angle at which the tow is laid over the mandrel can be adjusted between successive passes of the mandrel such that successive layers lie at different orientations from one another to form a ply structure and to influence the properties of the component (e.g. improved compressive or tensile strength of the manufactured component).

In all of the processes a lay-up head is typically used to dispense and apply the fibre reinforcement material to the application surface. The lay-up head typically comprises a roller (such as a fibre placement roller or an applicator roller) that presses the fibre reinforcement material against the application surface. In a previously considered arrangement, the roller is tiltable with respect to the remainder of the head such that the roller closely follows the contours of the application surface. However, if the roller is tiltable, this can create quality problems at the start of material application, and when the material is cut. This is due to the variable relative position between the roller and the nip.

It is therefore desirable to provide an improved lay-up head which can be used to manufacture a high-quality pre-form.

According to an aspect there is provided a lay-up head for applying elongate fibre reinforcement material to an application surface, comprising: a support head having a transverse axis; a dispensing mechanism carried by the support head for dispensing elongate fibre reinforcement material; a roller for pressing elongate fibre composite material against the application surface, wherein the roller is tiltable with respect to the support head such that the roller axis can be angled with respect to the transverse axis of support head; and a holding mechanism operable to hold the roller in a central position in which the roller axis is parallel to the transverse axis of the support head. This arrangement allows the roller to be held centrally, and then selectively released such that it can more closely follow the contours of the application surface. The lay-up head may have a tip region having a width dimension parallel to the transverse axis. The dispensing (or feeding) mechanism may be arranged to dispense or feed elongate fibre reinforcement material in a generally longitudinally extending dispensing direction. The longitudinally extending dispensing direction may be perpendicular to the transverse axis. The roller axis may be the rotational axis of the roller. The lay-up head may comprise one or more elongate fibre reinforcement material outlets. The elongate (i.e. width) direction of the or each outlet may be parallel to the transverse axis. There may be a plurality of material outlets. The roller may be located in front of the tip region and/or in front of the or each material outlet. The roller may pivotably attached to the support head. There may be a plurality of rollers. The lay-up head may be a composite material lay-up head.

The holding mechanism may be operable to apply a holding force to hold the roller in a central position. The holding mechanism may lock the roller in a central position. The holding mechanism may be operable to release the roller to allow it to tilt. When released, the roller may be able to tilt at least +/−1°, at least +/−2°, at least +/−3°, at least +/−4° or at least +/−5° with respect to the transverse axis. When released, the roller may be able to tilt no more than +/−45°, no more than +/−30°, no more than +/−15°, no more than +/−10°, or no more than +/−5° with respect to the transverse axis.

The roller may be biased to the central position. The holding mechanism may bias the roller to the central position. The roller may be biased to the central position by a biasing element such as a spring or other resilient element. Tilting movement of the roller may be damped. The holding mechanism may be arranged to damp tilting movement of the roller.

The roller may be pivotable with respect to the support head about a roller pivot axis. The roller may be pivotable with respect to the support head about a single axis only. The roller pivot axis may be substantially perpendicular to the roller axis. The pivot axis may be located centrally with respect to the support head. The roller may be mounted to a carrier which is pivotably mounted to the support head.

The holding mechanism may comprise at least one linear actuator acting between the support head and the roller. The holding mechanism may comprise first and second linear actuators arranged to act in generally opposing directions (i.e. towards or away from one another) between the support head and the roller. Each linear actuator may have a free end having a bearing surface arranged to act against a corresponding bearing surface. The corresponding bearing surface may be associated with the support head or the roller. The bearing surface may be provided by a boss or projection. The first and second linear actuators may be mounted to the support head. The first and second linear actuators may be attached to or coupled to the roller. The free end of each linear actuator may be arranged to act against a corresponding bearing surface associated with the roller. The first and second linear actuators may be arranged to act in opposing directions parallel to the transverse axis of the support head.

The first and second linear actuators may be pneumatic linear actuators, such as pneumatic cylinders. The holding mechanism may be operable to hold the roller in a central position by controlling the pressure of gas supplied to the first and second pneumatic linear actuators. The holding mechanism may be operable to release the roller by controlling the pressure of gas supplied to the first and second pneumatic linear actuators. The composite material lay-up head may further comprise a controller for controlling the pressure of gas supplied to the first and second pneumatic linear actuators.

The roller may be tiltable to either side of the central position.

The composite material lay-up head may further comprise a cutting mechanism carried by the support head and operable to sever elongate fibre reinforcement material passing through a nip of the cutting mechanism. The nip may extend in a direction substantially parallel to the transverse axis of the support head.

The composite material lay-up head may be arranged to simultaneously apply a plurality of lengths of elongate fibre reinforcement material side-by-side.

According to another aspect there is provided fibre reinforcement lay-up equipment, such as composite material lay-up equipment, comprising a lay-up head in accordance with any statement herein. The equipment may be automatic tape laying (ATL) or automatic fibre placement (AFP) equipment.

The invention may comprise any combination of the features and/or limitations referred to herein, except combinations of such features as are mutually exclusive.

Figure 2:
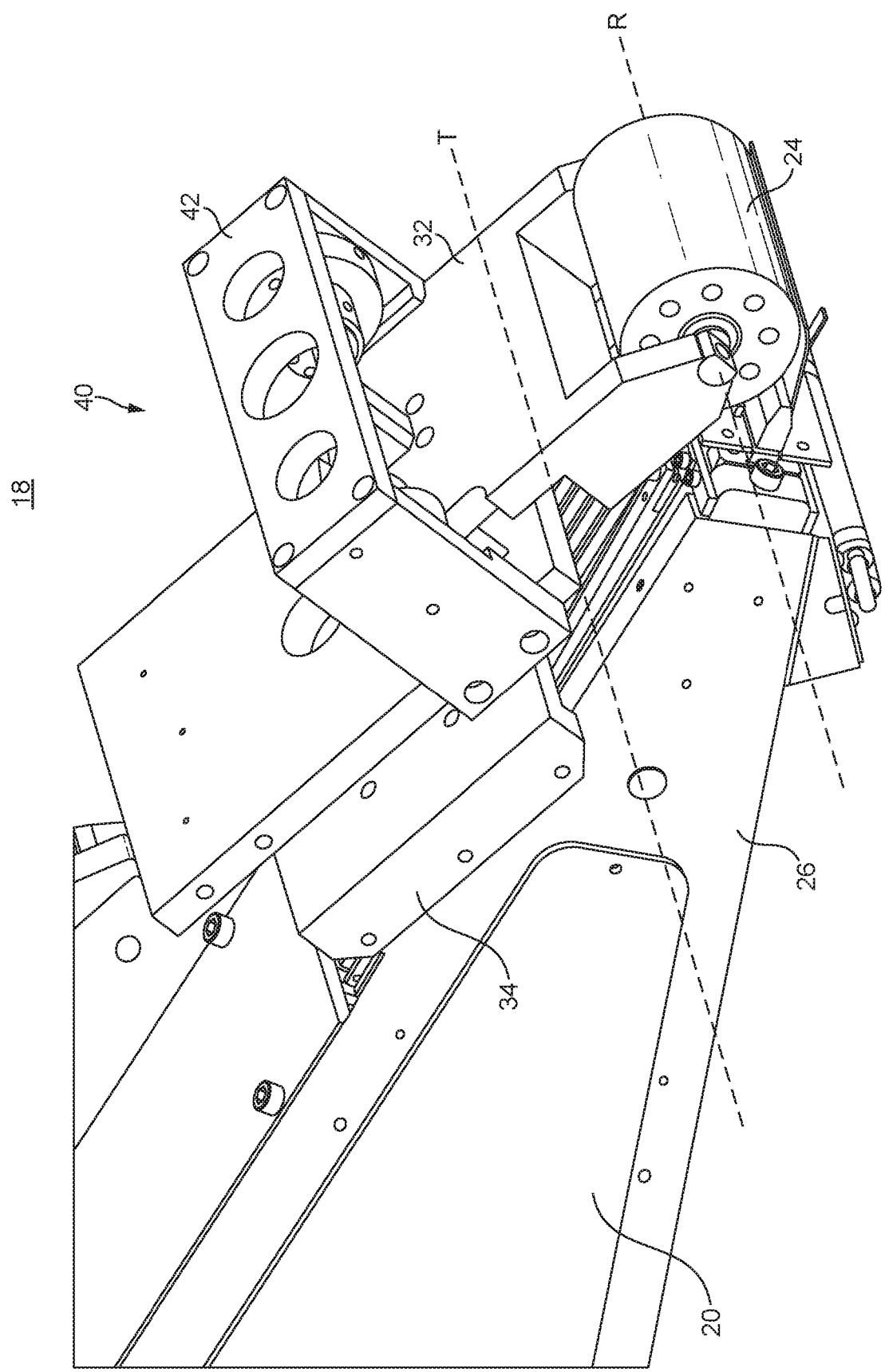
Figure 3:
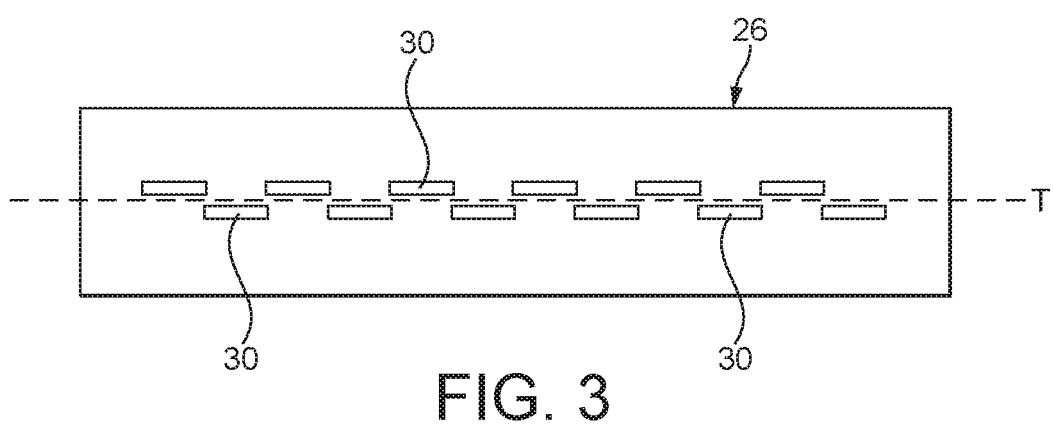
Figure 4:
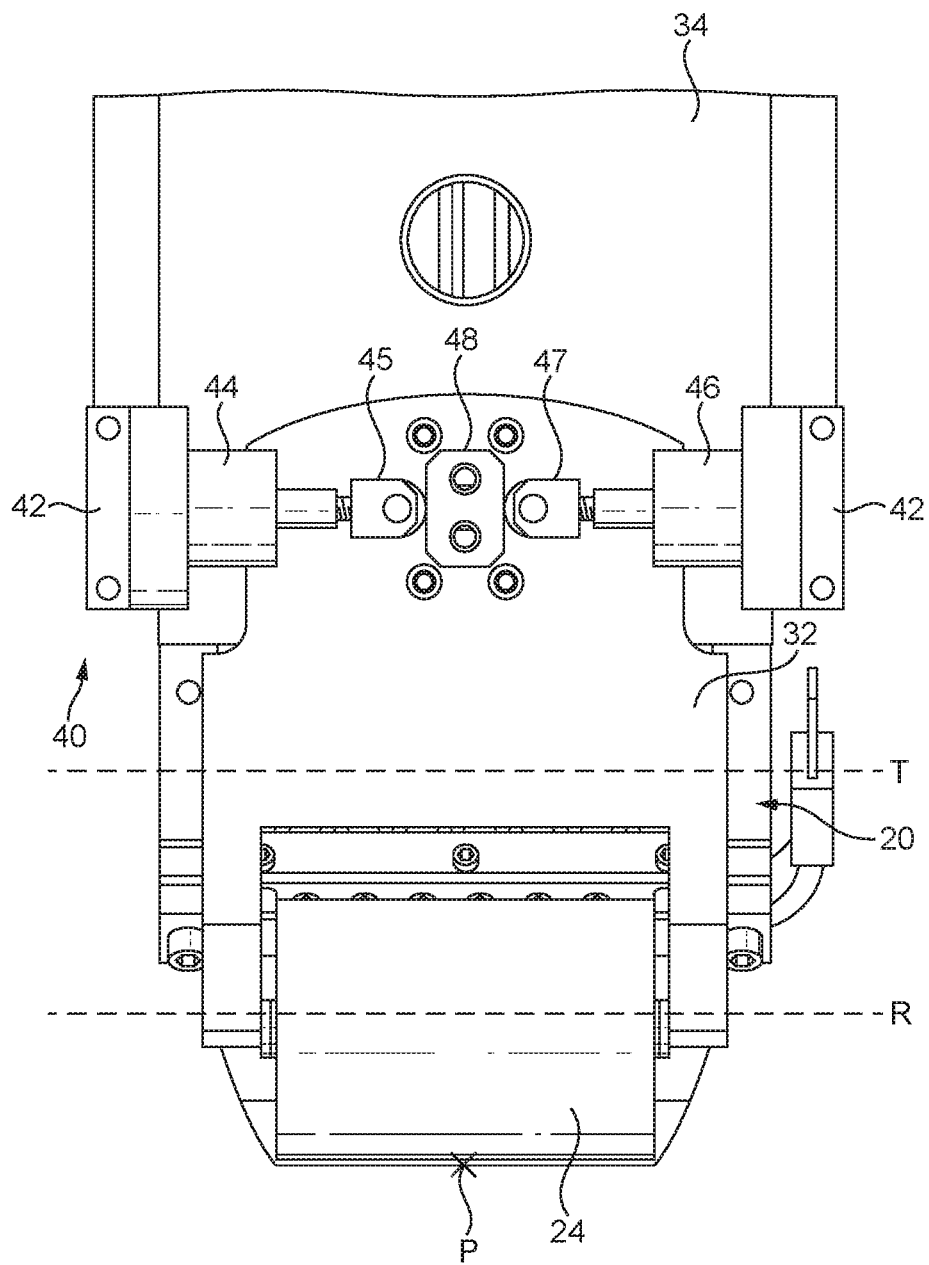
Figure 5:
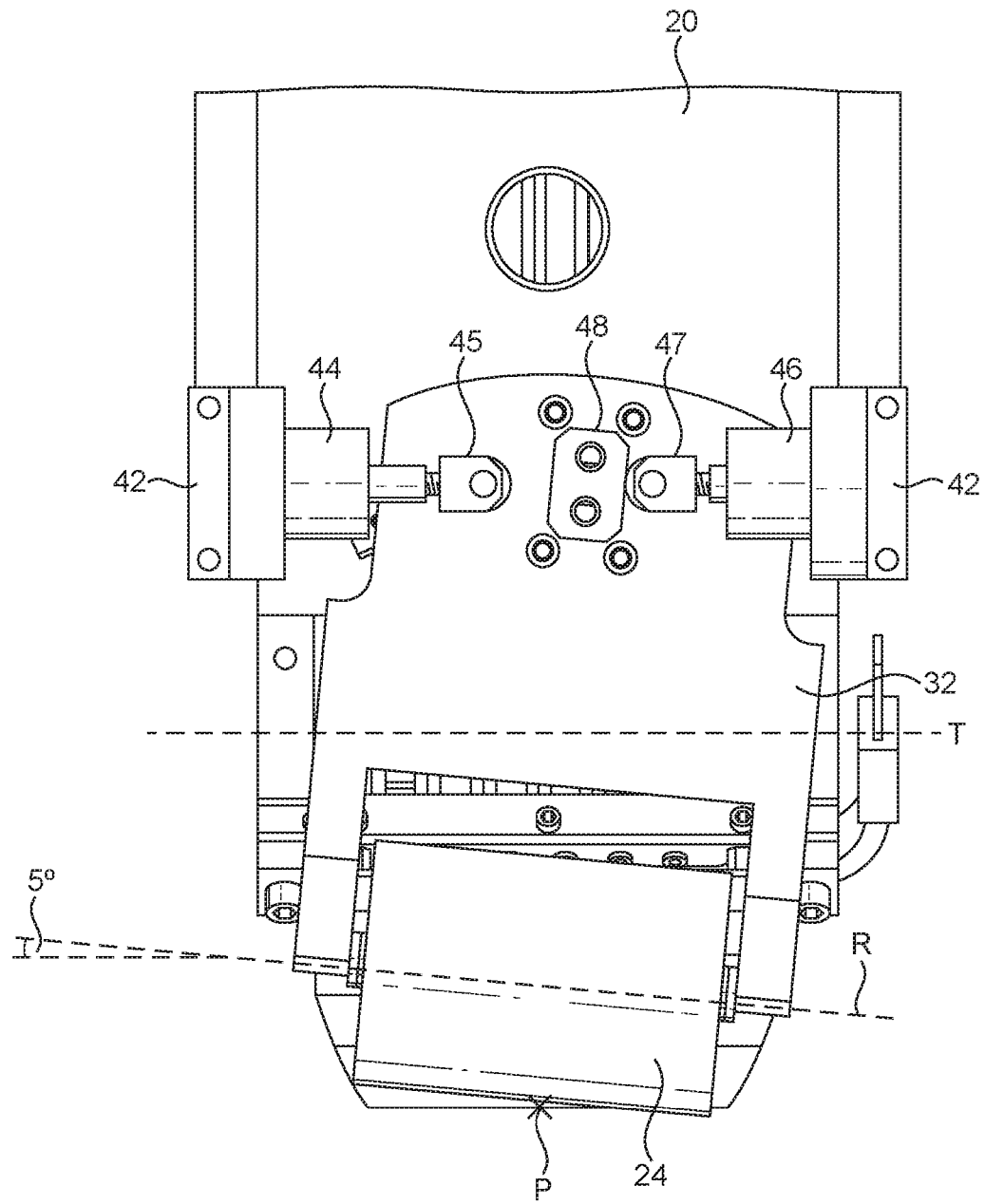
Figure 6:
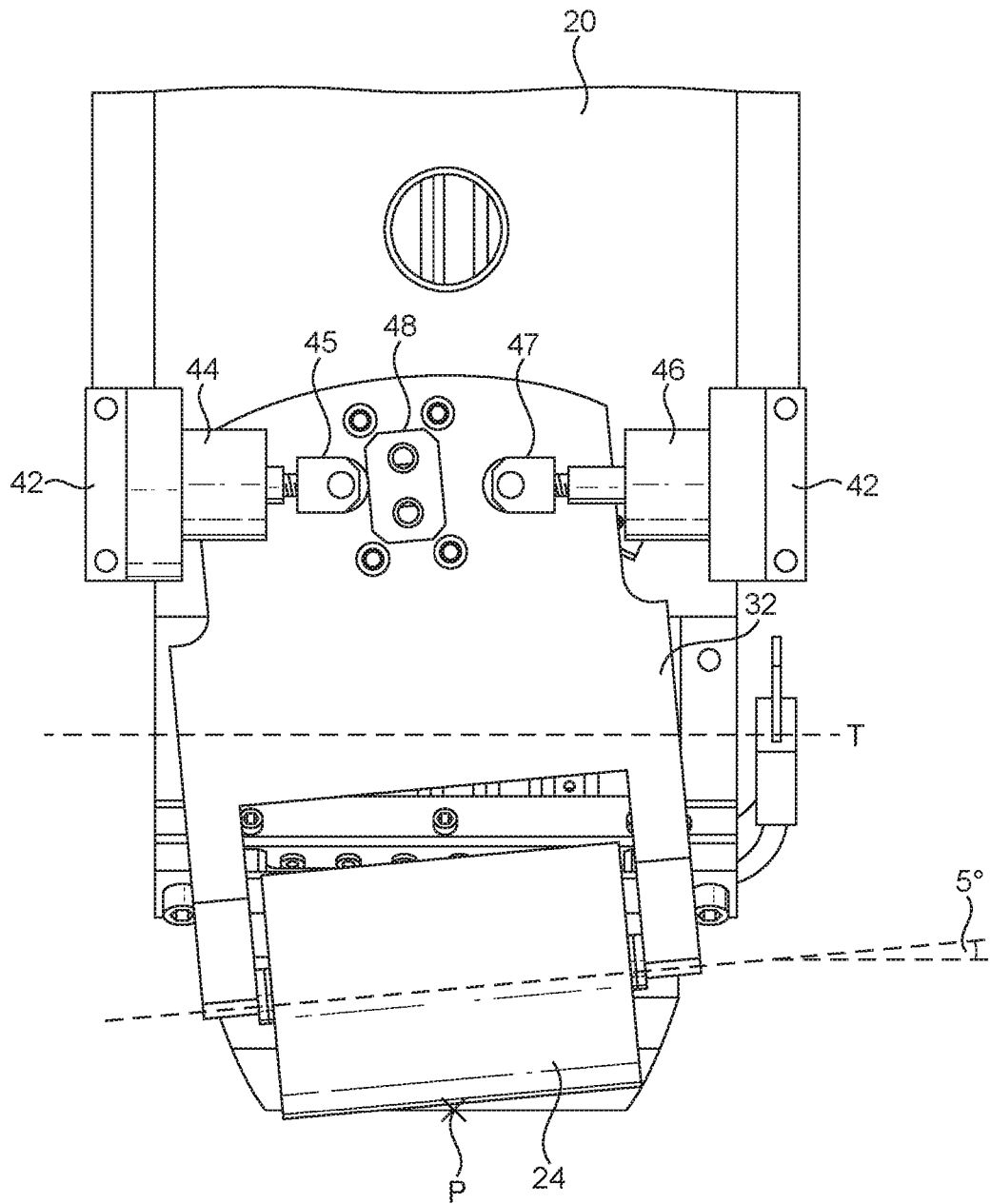

Embodiments of the invention will now be described, by way of example, with reference to the accompanying drawings, in which:

FIG. 1 schematically shows a composite material lay-up machine applying lengths of elongate fibre reinforcement material to an article;

FIG. 2 schematically shows a close-up view of the tip region of the composite material lay-up head of the machine of FIG. 1;

FIG. 3 schematically shows an end view of the tip region of the composite material lay-up head of FIG. 1 with the roller removed; and FIGS. 4-6 schematically show plan views of the tip region of the composite material lay-up head of FIG. 2 with the roller in different positions.

FIG. 1 shows composite material lay-up equipment 10 and a tool 12 to which fibre composite material is applied to form a pre-form for a composite material component, for example an aerospace component such as a fan blade. The equipment 10 performs a lay-up process in which a plurality of fibre composite tows 14 are applied to the tool surface 12 side-by-side. The equipment 10 comprises a base or gantry and a composite material lay-up head 18. The composite material lay-up head 18 comprises a support head 20 which carries a dispensing or feeding mechanism 28 for dispensing elongate fibre composite material 14, a cutting mechanism 22 for cutting lengths of fibre composite material 14, and a tiltable roller 24 (which may be referred to as a fibre placement roller or an applicator roller) located at the tip region 26 of the support head for pressing the fibre composite material 14 against the tool application surface. The dispensing mechanism 28 dispenses fibre composite material is a generally longitudinally extending dispensing direction that is parallel to the longitudinal axis (i.e. front to rear axis) of the support head 20.

In use, the equipment 10 feeds or dispenses a plurality of tows 14 and the lay-up head 18 is moved relative to the surface of the tool 12 to apply the tows 14 to the surface of the tool. In this embodiment the tows 14 are pre-impregnated with matrix material such as epoxy resin, but in other embodiments each tow may comprise fibre reinforcement material only (often referred to as "dry fibre") and matrix material may be added subsequently. The tows 14 pass between the tool 12 and the roller 24 which presses them against the tool 12. The roller 24 is tiltable with respect to the support head (i.e. the roller axis can be tilted) so that the roller 24 can closely follow the contour of the application surface. At the end of an appropriate stage of the lay-up process, the tows 14 are cut by the cutting mechanism 22. It is desirable to ensure that the roller 24 is centred (i.e. its axis is parallel to the transverse axis of the support head 20) when the tows 14 are cut and when the application of tows 14 is started again. As will be described in detail below, the lay-up head 18 is provided with a holding mechanism that is operable to hold the roller 24 in a central position, and which is also operable to release the roller 24 such that it can tilt with respect to the support head 20.

FIGS. 2 and 3 show a close-up view of the tip region 26 of the composite material lay-up head 18. The lay-up head 18 has a longitudinal axis that is parallel to the dispensing/application direction of the tows 14 and a transverse axis T that is perpendicular to the longitudinal axis. The lay-up head 18 has a plurality of tow outlets 30, each in the form of a narrow slit, through which the tows 14 are dispensed. The tow outlets 30 are arranged side-by-side along a line parallel to the transverse axis T and the width direction of each outlet 30 is parallel to the transverse axis T. It should be appreciated that there may be a single tow outlet 30 in the form of a wide narrow slit having a width direction parallel to the transverse axis T. The cutting mechanism 22 has a nip (not shown) associated with each tow outlet 30 through which a respective tow 14 passes. The nip is defined by one or more moveable cutting elements that can be moved to sever a length of fibre composite material.

The roller 24 is rotatably mounted to a roller carrier 32. The roller 24 can thus rotate about a roller axis R with respect to the carrier 32. The carrier 32 is pivotably mounted to a support bracket 34 that is fixed to the support head 20. The upper surface of the support bracket 34 comprises an arcuate guide rail (not visible in the Figures) in the form of an arcuate slot. The arcuate guide rail has a constant radius of curvature. The centre of the curve radius is positioned at the tip of the roller 24 and is positioned at the transverse mid-point P. The rear side of the roller carrier 32 is provided with a projection (not shown) which is located within the arcuate guide slot, and which is arranged to slide within the arcuate guide slot. This means that the roller carrier 32 is pivotably with respect to the support bracket 34 (and hence the support head 20) about a pivot axis P such that the carrier 32 and roller 24 assembly can pivot with respect to the support head 20. The pivot axis P is perpendicular to the transverse axis T of the support head. The carrier 32 is mounted to the support head 20 such that the roller 24 is positioned in front of the tow outlets 30. Since the carrier 32 is pivotably mounted, the roller 24 can pivot (or tilt) with respect to the support head 20. With the carrier 32 and roller 24 in a central position (as shown in FIG. 2) the roller axis R is parallel to the transverse axis T of the support head 20. However, the roller 24 can pivot about the roller pivot axis P such that the roller axis R can be angled (or inclined/tilted) with respect to the transverse axis T. The roller 24 can be pivoted from a central position in either direction (i.e. clockwise or anti-clockwise) such that the roller axis R is angled by +/−5° with respect to the transverse axis T. It should be appreciated that in other embodiments the range of movement may be greater or less than +/−5°.

The lay-up head 18 also comprises a holding mechanism 40 that is operable to hold the roller 24 in a central position in which the roller axis R is parallel to the transverse axis T. The holding mechanism 40 is also operable to release the roller 24 such that the roller can pivot (or tilt) with respect to the support head 20. In this embodiment, the holding mechanism 40 also biases the roller 24 to the central position, and also provides damping to the pivoting movement of the roller 24 when released. However, it should be appreciated that in other embodiments this functionality may not exist, or may be provided by other means. For example, a separate spring could be provided to bias the roller 24 to the central position.

Referring now to FIG. 4, the holding mechanism 40 comprises a U-shaped bracket 42 mounted to the support head 20 such that it is positioned over the roller carrier 32. The bracket 42 has two parallel side limbs, the ends of which are attached to the support bracket 42 either side of the carrier 32, and a bridge member that connects the side limbs together and spans the width of the support head 20. The holding mechanism 40 also comprises two pneumatic linear actuators 44, 46. A first pneumatic linear actuator 44 has one end fixed to one side limb of the bracket 42 and a second pneumatic linear actuator 46 has one end fixed to the other side limb of the bracket 42. The pneumatic linear actuators 44, 46 are arranged such their longitudinal axes are aligned with one another and parallel to the transverse axis T of the support head. In other words, their lines of action (i.e. the direction in which they generate linear movement) are aligned with one another and parallel to the transverse axis T. The pneumatic linear actuators 44, 46 are also arranged so that they act in opposing directions towards one another (i.e. one actuator extends towards the right, and the other actuator extends towards left). Each pneumatic linear actuator 44, 46 has a free end 45, 47 that has a convex bearing surface. The bearing surface may be a low-friction material, for example.

The pivotable roller carrier 32 has a boss 48 (i.e. a projection or stud) that projects from the surface of the carrier 32 and which has a bearing surface, which may be a low-friction material. The boss 48 is spaced from the pivot axis P in a direction perpendicular to the transverse axis T and the boss 48 is aligned with the axes of the linear actuators 44, 46 (with the carrier/roller in a central position). With both pneumatic linear actuators 44, 46 extended (as shown in FIG. 4) the free ends 45, 47 bear (i.e. act) against the bearing surface of the boss 48, thereby maintaining the carrier 32 and hence the roller 24 in a central position in which the roller axis R is parallel to the transverse axis T of the support head 20.

The pneumatic linear actuators 44, 46 are connected to a source of pressurised gas and a controller (not shown) is provided which allows the gas pressure supplied to the linear actuators 44, 46 to be altered. In this embodiment the gas pressure supplied to the pneumatic linear actuators 44, 46 can be changed between a "high" pressure, in which the roller 24 is held in a central position, and a "low" pressure, in which the roller 24 is released and allowed to pivot. The actual values of the high and low pressures depend on a number of factors.

As shown in FIG. 4, with a high gas pressure supplied to both pneumatic linear actuators 44, 46, the respective pistons are extended and the free ends 45, 47 of actuators 44, 46 bear against the boss 48 and therefore apply a force to the boss 48. Since the pressure supplied to both linear actuators 44, 46 is the same, the carrier 32 and therefore the roller 24 is held in a central position in which the roller axis R is parallel to the transverse axis T. The holding force applied by the holding mechanism 40 depends on the gas pressure supplied to the linear actuators 44, 46. The higher the gas pressure supplied, the greater the holding force and therefore the greater the force required to pivot the carrier and roller 24 away from the central position. In this particular embodiment, the "high" gas pressure supplied is chosen such that under all operational conditions of the lay-up head 18, when the high gas pressure is supplied, the roller 24 will be centred. However, it should be appreciated that if a sufficient torque is applied to the carrier 32, the roller 24 could be pivoted away from a central position. In use, the high gas pressure is supplied to the pneumatic linear actuators 44, 46 during tow start (i.e. at the beginning of an application stroke) and tow stop (i.e. at the end of an application stroke and prior to tow cutting) to ensure a high-quality and repeatable lay-up procedure.

However, during an application stroke or movement in which the lay-up head 18 is moved over the application surface to apply fibre composite material to the surface it is desirable for the roller 24 to pivot/tilt with respect to the support head 20 so that it can more closely follow the contours of the application surface. In order to release the roller 24 so that it can pivot/tilt, a low gas pressure is supplied to the pneumatic linear actuators 44, 46. The pressure of gas supplied is selected such that it is sufficiently low to allow sufficient pivoting movement of the roller 24 under operational conditions. Referring to FIGS. 5 and 6, with a low gas pressure supplied to the pneumatic linear actuators 44, 46, the force that they apply to the boss 48 is significantly reduced such that the torque required to pivot the carrier 32 is significantly reduced. This means that as the lay-up head 18 is moved over the lay-up surface, the roller 24 can pivot about the roller pivot axis P such that it can be inclined in either direction with respect to the support head 20. Specifically, in this embodiment the roller 24 can pivot clockwise (FIG. 5) such that the roller axis R is angled with respect to the transverse axis T by up to 5°, and can pivot anti-clockwise (FIG. 6) such that the roller axis R is angled with respect to the transverse axis T by up to 5°. Of course, other angles could be chosen depending on the specific application.

As the roller 24 and roller carrier 32 pivot about the roller pivot axis P in the clockwise direction (FIG. 5), the boss 48 acts against the free end 47 of the second pneumatic linear actuator 46 and compresses the gas within the cylinder. The second linear actuator 46 therefore acts to damp the pivoting movement of the roller 24. When the torque is removed from the roller 32 (e.g. if the lay-up head 18 is lifted away from the application surface), the second pneumatic linear actuator 46 extends once again, centring the roller 24. Similarly, as the roller 24 pivots in the anti-clockwise direction (FIG.

6), the boss 48 acts against the free end 45 of the first pneumatic linear actuator 44 and compresses the gas within the cylinder. The first linear actuator 44 therefore acts to damp the pivoting movement of the roller 24. When the torque is removed from the roller 32, the first pneumatic linear actuator 44 extends once again, centring the roller 24. The pneumatic linear actuators 44, 46 of the holding mechanism 40 therefore also provide a damping mechanism, damping pivoting movement of the roller 24, and bias the roller 24 to a central position.

It should be appreciated that as opposed to supplying either the same "high" or "low" pressure to the pneumatic linear actuators, the gas pressures supplied to the pneumatic actuators could be different, and could be any suitable value. For example, in some circumstances a very high pressure may need to be supplied to the pneumatic linear actuators in order to hold the roller centrally. In other circumstances different pressures may need to be supplied to the pneumatic linear actuators to permit the desired movement.

As opposed to using two pneumatic linear actuators, the holding mechanism could use other types of linear actuator, such as a linear electric motor, a linear piezo motor, or hydraulic linear actuators, for example. If, for example, a hydraulic linear actuator was used, in order to release the roller 24 it may be necessary to retract the pistons such that the carrier 32 can pivot. In some embodiments, the ends of the linear actuators could be fixed to the roller 24 or carrier 32 in order to hold and release it. In another arrangement, the linear actuators could be fixed to the carrier 32, and act against the support head 20.

Although it has been described that the holding mechanism 40 comprises two pneumatic linear actuators 44, 46, it should be appreciated that the holding mechanism 40 may be constructed in any suitable way, providing that the roller 24 can be locked (or held) and released. For example, the holding mechanism could simply be a latch or catch that can be engaged to hold the roller 24, and disengaged to release it and allow it to pivot or tilt. In another arrangement, the holding mechanism could comprise one or more electromagnets that can be operated to hold the roller and released to allow movement.

In the embodiment described above the roller 24 is pivotable about a pivot axis P with respect to the support head 20. However, in other arrangements the roller 24 could be tiltable with respect to the support head 20. For example, the roller 24 could have pins located in parallel slots attached to the support head 20, with the pins slidable in the slots to allow tilting movement. The holding mechanism 40 may then either force the roller against the end of the slots to prevent tilting and hold it in a central position, and then the holding mechanism may be released to allow it to tilt. Of course, other suitable arrangements may also be used.

I claim:

1. A lay-up head for applying elongate fibre reinforcement material to an application surface, comprising:
   a support head having a transverse axis;
   a dispenser carried by the support head configured to dispense elongate fibre reinforcement material;
   a roller for pressing elongate fibre composite material against the application surface, wherein the roller is configured to be selectively tiltable with respect to the support head such that a roller axis can be angled with respect to the transverse axis of support head; and
   a holding mechanism operable in a first state to apply a holding force to hold the roller in a central position in which the roller axis is held parallel to the transverse axis of the support head;
   wherein the holding mechanism is operable in a second state, to apply a smaller holding force than the first state when the roller is in the central position, to selectively release the roller to allow the roller to tilt with respect to the transverse axis, such that the roller can more closely follow contours of the application surface than in the first state.

2. A lay-up head according to claim 1, wherein the roller is biased to the central position; and
   wherein the holding mechanism biases the roller to the central position.

3. A lay-up head according to claim 1, wherein tilting movement of the roller is damped; and
   wherein the holding mechanism is arranged to damp a tilting movement of the roller.

4. A lay-up head according to claim 1, wherein the roller is pivotable with respect to the support head about a roller pivot axis; and
   wherein the roller pivot axis is substantially perpendicular to the roller axis.

5. A lay-up head according to claim 4, wherein the roller is mounted to a carrier which is pivotably mounted to the support head.

6. A lay-up head according to claim 1, wherein the holding mechanism comprises at least one linear actuator acting between the support head and the roller.

7. A lay-up head according to claim 1, wherein the holding mechanism comprises a first linear actuator and a second linear actuator, the first and second linear actuators arranged to act in generally opposing directions between the support head and the roller.

8. A lay-up head according to claim 7, wherein each of the first and second linear actuators has a free end having a bearing surface arranged to act against a corresponding bearing surface.

9. A lay-up head according to claim 8, wherein the first and second linear actuators are mounted to the support head and wherein the free end of each of the first and second linear actuators is arranged to act against the corresponding bearing surface associated with the roller.

10. A lay-up head according to claim 7, wherein the first and second linear actuators are arranged to act in opposing directions parallel to the transverse axis of the support head.

11. A lay-up head according to claim 7, wherein the first and second linear actuators comprise first and second pneumatic linear actuators.

12. A lay-up head according to claim 11, wherein the holding mechanism is operable to hold the roller in the central position by controlling a pressure of gas supplied to the first and second pneumatic linear actuators.

13. A lay-up head according to claim 11,
   wherein the holding mechanism is operable to release the roller by controlling a pressure of gas supplied to the first and second pneumatic linear actuators.

14. A lay-up head according to claim 12, further comprising a controller configured to control the pressure of gas supplied to the first and second pneumatic linear actuators.

15. A lay-up head according claim 1, wherein the roller is tiltable to either side of the central position when selectively released by the holding mechanism.

16. A lay-up head according to claim 1, further comprising a cutting mechanism carried by the support head and operable to sever the elongate fibre reinforcement material passing through a slot of the cutting mechanism; and
   wherein the slot extends in a direction parallel to the transverse axis of the support head.

17. A lay-up head according to claim 1, wherein the lay-up head is arranged to simultaneously apply a plurality of lengths of elongate fibre reinforcement material side-by-side.

18. A lay-up head for applying elongate fibre reinforcement material to an application surface, comprising:
- a support head having a transverse axis;
- a dispenser carried by the support head configured to dispense elongate fibre reinforcement material;
- a roller for pressing elongate fibre composite material against the application surface, wherein the roller is configured to be selectively tiltable with respect to the support head such that a roller axis can be angled with respect to the transverse axis of support head;
- a holding mechanism operable to hold the roller in a central position in which the roller axis is parallel to the transverse axis of the support head, the holding mechanism comprising: pneumatic actuators, including a first linear actuator and a second linear actuator, the first and second linear actuators arranged to act in generally opposing directions between the support head and the roller,
- wherein the holding mechanism is operable in a first state to apply a holding force to hold the roller in a central position and operable in a second state to release the roller by controlling a pressure of gas supplied to the first and second linear actuators to apply a smaller holding force on the roller in the central position than in the first state, and wherein the holding mechanism is operable to selectively release the roller to allow the roller to tilt with respect to the transverse axis, such that the roller can more closely follow contours of the application surface than in the first state; and
- a controller configured to control the pressure of the gas supplied to the first and second linear actuators.

19. A lay-up head for applying elongate fibre reinforcement material to an application surface, comprising:
- a support head having a transverse axis;
- a roller for pressing elongate fibre composite material dispensed by the lay-up head against the application surface, wherein the roller is configured to be selectively tiltable with respect to the support head such that a roller axis can be angled with respect to the transverse axis of support head; and
- a holding mechanism operable in a first state to apply a holding force to hold the roller in a central position in which the roller axis is parallel to the transverse axis of the support head;
- wherein the holding mechanism is operable in a second state, to apply a smaller holding force than the first state when the roller is in the central position, to selectively release the roller to allow the roller to tilt with respect to the transverse axis, such that the roller can more closely follow contours of the application surface than in the first state.

* * * * *